April 14, 1970         E. A. RING         3,505,680
SAFETY GOGGLE
Filed Sept. 9, 1968
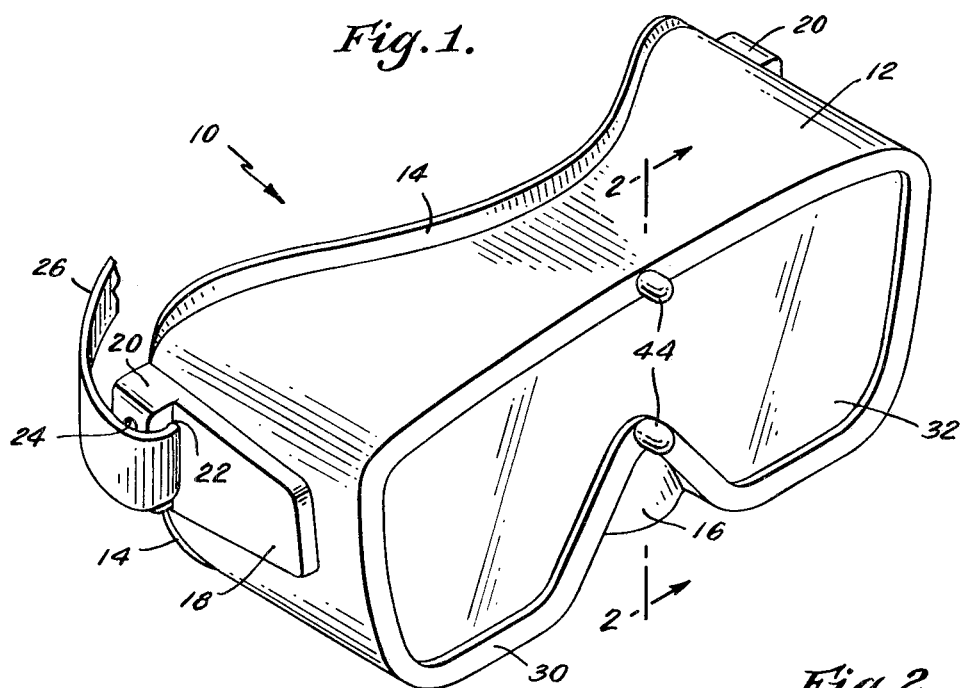
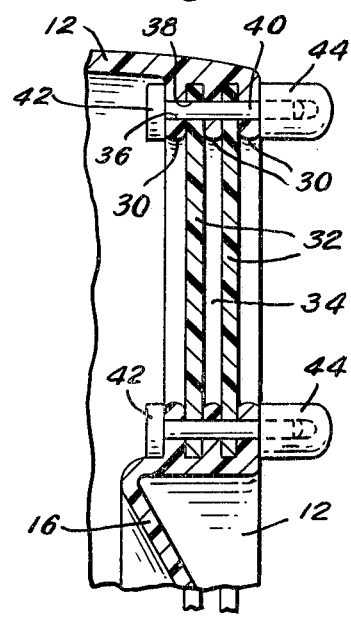
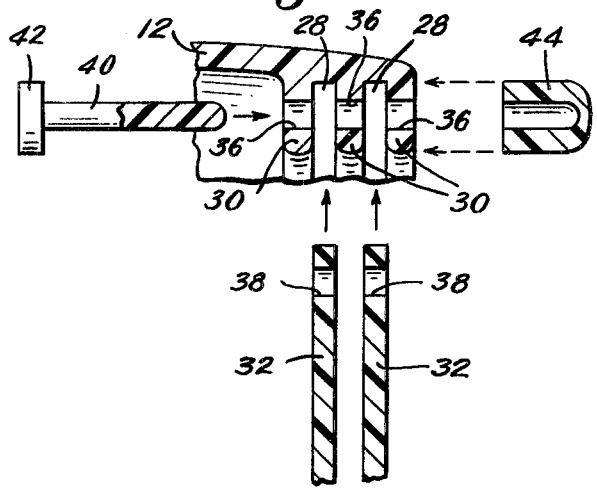
Inventor,
Ernest A. Ring,
by Salter & Michaelson
Att'ys.

United States Patent Office 3,505,680
Patented Apr. 14, 1970

3,505,680
SAFETY GOGGLE
Ernest A. Ring, Riverside, R.I., assignor to Watchemoket Optical Co., Inc., Providence, R.I., a corporation of Rhode Island
Filed Sept. 9, 1968, Ser. No. 758,262
Int. Cl. A61f 9/02
U.S. Cl. 2—14                               1 Claim

ABSTRACT OF THE DISCLOSURE

A safety goggle comprising a frame having means for mounting a pair of spaced lenses with an insulating air space therebetween whereby the goggle will not fog, even when subject to sudden temperature changes, said double lens construction eliminating the necessity of vents, thus further enhancing the safety characteristics of the goggle, said lenses having means for securely mounting them in the frame but for readily permitting removal of the lenses whenever necessary or desirable.

BACKGROUND OF THE INVENTION

Safety goggles of the general type of that characterized by the instant invention are old and well known in the art. More specifically, safety goggles have long been provided wherein the goggle comprises a frame portion having an inner lip that snugly engages the face of the wearer and surrounds the wearer's eyes and wherein the outer edge of the frame portion has means for receiving a lens therein. Such a goggle protects the eyes of the wearer during a multitude of industrial and chemical operations. It has been found, however, that sudden changes in temperature or humidity cause fogging of the lens, thus necessitating that some sort of vent means be employed for equalizing the temperature inside and outside of the lens. Such vent means have proven to be only partially successful for their intended purposes; and, furthermore, the presence of such vent means in the goggle frame raises the possibility that chemical splash may result in introduction of a harmful chemical through the vent means to the eyes of the wearer. Also, the prior art safety goggles of the instant type have generally had to be discarded when the lens either becomes broken or impaired in any way. In other words, the prior art does not teach a safety goggle wherein the lens is securely mounted in the frame and maintained against accidental displacement therefrom, but wherein the lens is nevertheless readily removable when necessary or desirable.

SUMMARY OF THE INVENTION

As hereinbefore stated, the instant invention relates to a safety goggle comprising a frame portion that is preferably injection molded of polyvinyl chloride. The frame has an inner lip or rim that intimately engages the face of the wearer and surrounds the wearer's eyes. The outer edge of the frame is provided with means in the form of a pair of spaced grooves for receiving a pair of lenses in closely spaced relation, whereupon an insulating air space exists between the lenses. This air space serves to insulate the lenses against fogging, even when the goggle is subjected to sudden temperature changes; and hence the presence of this air space eliminates the necessity of employing vent means in the goggle frame. Due to the resilience of the frame portion, the lenses may be easily snapped into the peripheral grooves that are provided for receiving the lenses; and in order to maintain the lenses securely in assembled position, pin means are provided that extend through the frame and the lenses to securely couple the lenses to the frame. If, however, it should become necessary for any reason to remove the lenses, it is simply necessary to remove the pin means, whereupon the lenses may be removed from their mounting substantially as easily as they were originally assembled in their mounting.

DESCRIPTION OF THE DRAWING

In the drawing which illustrates the best mode presently contemplated for carrying out the present invention:

FIG. 1 is a perspective view of a safety goggle constructed in accordance with the instant invention;

FIG. 2 is an enlarged fragmentary section taken on line 2—2 of FIG. 1; and

FIG. 3 is a sectional view similar to FIG. 2 showing the removability of the lenses from the goggle frame.

DESCRIPTION OF THE INVENTION

Referring now to the drawings, and more particularly to FIG. 1 thereof, there is shown generally at 10 a safety goggle constructed in accordance with the instant invention. The goggle 10 comprises a frame 12 that is integrally constructed preferably of a relatively soft, resilient material. For example, the frame 12 may be injection molded of polyvinyl chloride. As will be noted, the frame 12 comprises a continuous wall that surrounds the eyes of the wearer and extends substantially perpendicularly from the face of the wearer when in operative position. At the inner edge of the frame 12 there is provided an integral peripheral lip 14 which makes intimate contact with the face of the wearer, it being apparent that the lip 14 will not only serve to provide maximum comfort for the wearer in that it avoids the presence of sharp corners bearing against the face of the wearer, but also the lip 14 functions as a form of seal against the face of the wearer, thus promoting maximum safety to the wearer. It will be understood that the lip 14 extends substantially continuously around the periphery of the inner edge of the frame 12, although a nose piece 16 is provided for engaging the nose of the wearer. It is important to note that the frame 12 is imperforate.

At the opposite side ends of the frame 12 there is provided an integral projecting portion 18 which provides space on the interior of the frame for the temple bars of eyeglasses in case the goggle 10 is worn by someone who wears glasses. The projecting portion 18 has a solid boss 20 at its rear extremity, said boss having slots 22 and 24 therein for receiving and securing the ends of resilient strap 26 which is adapted to encircle the head of the wearer to maintain the goggle 10 in operative position, all in a manner well known in the art.

Adjacent the forward end of frame 12 and on the inner surface thereof, there is provided a pair of spaced peripheral grooves defined by three inwardly extending peripheral flanges 30. The grooves 28 function to receive therein a pair of identical lenses 32, each of which is configured to correspond to the configuration of the frame 12. These lenses may be of any suitable plastic material and may be tinted if desired. Due to the resilience of frame 12, it will be seen that the lenses 32 may be easily worked and manipulated into the grooves 28; and, once so mounted, the lenses 32 will form a sealing engagement with the frame whereby to capture an insulating air space 34 between the lenses. This air space serves to prevent fogging of the lenses 32 even when the goggle is subjected to sudden temperature changes and eliminates the necessity of providing vent means in the frame 12 for achieving this purpose, which vent means could possibly provide an area for introduction of chemical splash which would be harmful to the eyes of the wearer.

Although the lenses 32, when mounted in the grooves 28, are reasonably secure, additional means are nevertheless provided for insuring against accidental displacement of the lenses 32 from frame 12 during use of goggle 10. To this end, the flanges 30 are provided with aligned apertures 36 located at the top center of the frame and at the portion of the frame just above nose guard 16. The lenses 32 are provided with corresponding apertures 38; whereupon, when the lenses are mounted in their grooves 28, the apertures 36 and 38 will all be in alignment, as shown most clearly in FIGS. 2 and 3. A pin 40 having an integral head 42 is then slid through the aligned apertures, it being noted that the head 42 bears against the inner surface of the innermost flange 30; whereupon the free extremity of pin 40 extends outwardly from the outer surface of the outermost flange 30. A retaining cap 44 slidably receives the free end of pin 40 to maintain the pin securely assembled to frame 12 and lenses 32. It will thus be seen that the pin 40 serves to securely maintain the lenses 32 assembled to frame 12 and functions as positive means for preventing inadvertent displacement of the lenses from the frame. When, however, it is desired to remove the lenses 32 for any reason, the cap 44 is removed from pin 40; whereupon the pin may be slidably removed from its mounted position, thus freeing the lenses 32 for manual removal from their mounting grooves, which removal may be easily accomplished due to the resilient construction of frame 12. The pin 40 and cap 44 may be constructed of any suitable material, although I prefer to make these parts of plastic construction.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described.

What is claimed is:

1. A safety goggle comprising a frame having a continuous wall that extends substantially perpendicularly outward from the face of the wearer when in operative position, the inner edge of said wall defining a continuous lip that makes intimate contact with the face of the wearer and surrounds the eyes of the wearer, mounting means adjacent the outer edge of said wall receiving a paid of spaced lenses, said lenses being in spaced parallel disposition to each other with each of said lenses spanning said frame, said mounting means effecting a sealing engagement with the peripheral edge of each of said lenses whereby a dead air space is provided between said lenses, and readily releasable means for securely maintaining said lenses in their mounted position, said mounting means comprising three peripheral flanges extending inwardly from said wall, said flanges defining a pair of spaced peripheral grooves on the inner surface of said wall, said releasable maintaining means comprising aligned apertures in said flanges and lenses, and a pin of sufficient length to extend through all of said apertures, said pin having an enlarged head at one end and a retaining member frictionally and sildably received at its other end, whereby when said pin is assembled to the goggle with its retaining member in operative position, both of said lenses are locked in place.

References Cited

UNITED STATES PATENTS

| | | | |
|---|---|---|---|
| 2,648,843 | 8/1953 | Hirschmann | 2—14.20 |
| 3,056,140 | 10/1962 | Lindblom | 2—14.8 |
| 3,395,406 | 8/1968 | Smith | 2—14.13 |

FOREIGN PATENTS

| | | |
|---|---|---|
| 419,586 | 11/1934 | Great Britain. |
| 698,614 | 10/1953 | Great Britain. |
| 1,010,573 | 11/1965 | Great Britain. |

H. HAMPTON HUNTER, Primary Examiner